No. 852,282. PATENTED APR. 30, 1907.
P. D. MILLOY.
CAR SIGNAL.
APPLICATION FILED NOV. 9, 1903. RENEWED SEPT. 24, 1906.
2 SHEETS—SHEET 1.
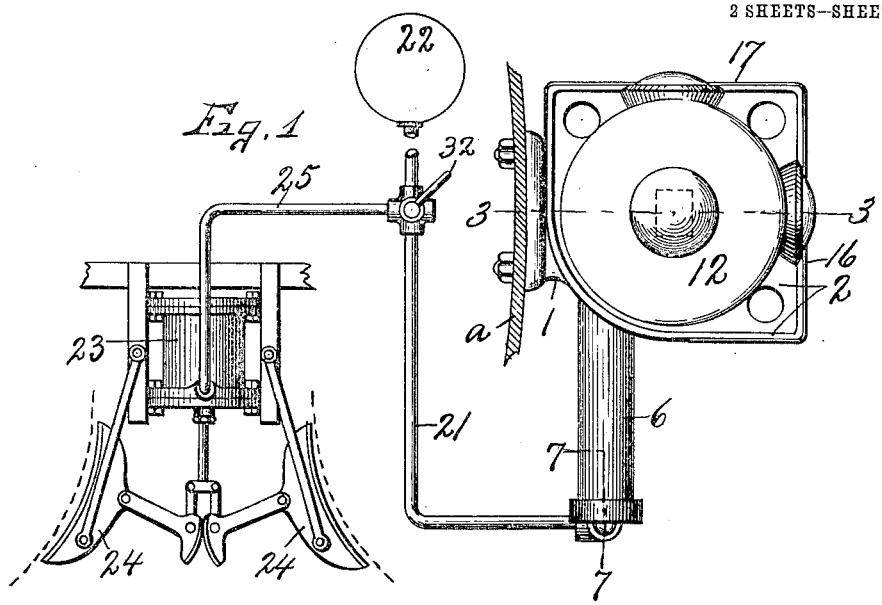
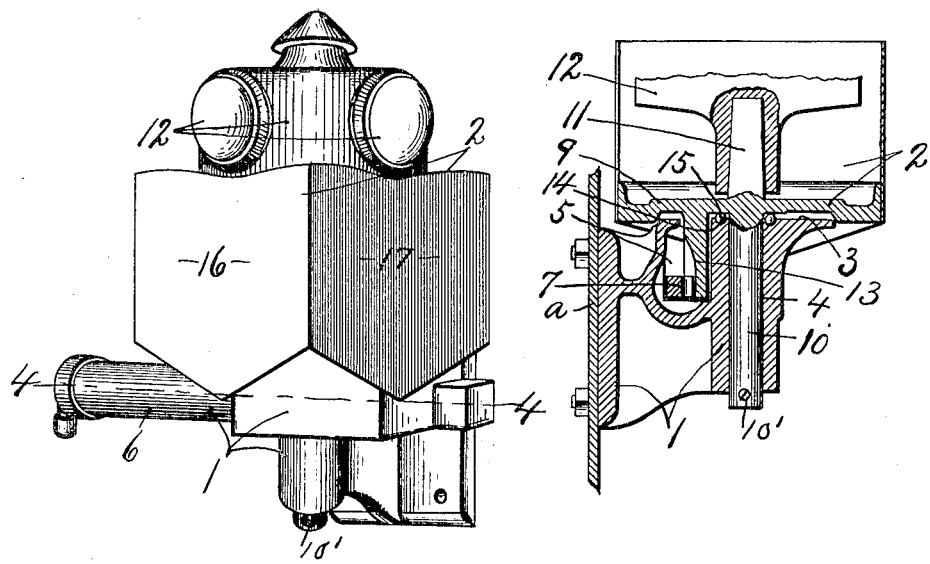
Witnesses:
F. E. Arthur,
H. E. Chase
Inventor:
Peter D. Milloy
By Howard P. Davidson
Attorney.

No. 852,282. PATENTED APR. 30, 1907.
P. D. MILLOY.
CAR SIGNAL.
APPLICATION FILED NOV. 9, 1903. RENEWED SEPT. 24, 1906.
2 SHEETS—SHEET 2.
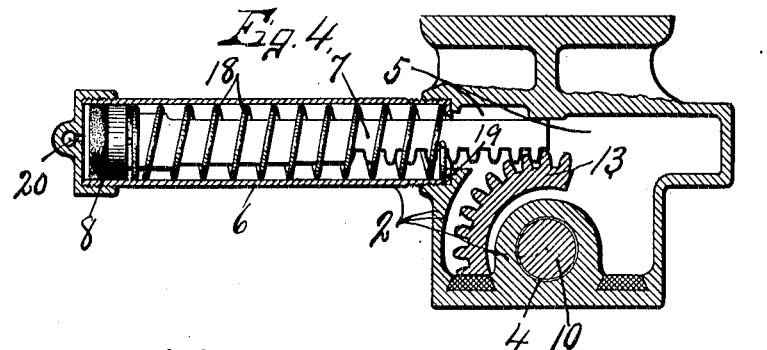
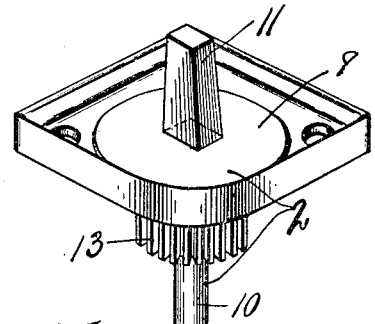
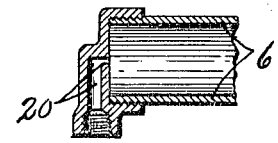
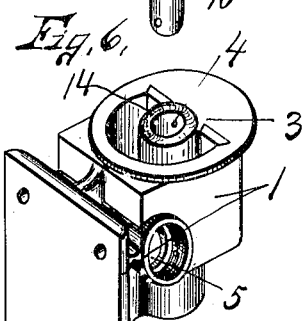
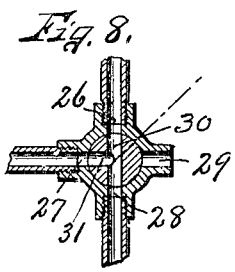
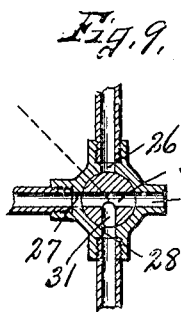
Witnesses:
F. E. Arthur
H. E. Chase
Inventor:
Peter D. Milloy
By Howard P. Denison
Attorney.

UNITED STATES PATENT OFFICE.

PETER D. MILLOY, OF BUFFALO, NEW YORK.

CAR-SIGNAL.

No. 852,282.        Specification of Letters Patent.        Patented April 30, 1907.

Application filed November 9, 1903. Renewed September 24, 1906. Serial No. 335,995.

*To all whom it may concern:*

Be it known that I, PETER D. MILLOY, of Buffalo, in the county of Erie, in the State of New York, have invented new and useful Improvements in Car-Signals, of which the following, taken in connection with the accompanying drawings, is a full, clear, and exact description.

This invention relates to improvements in car signals and may be properly termed a rear end signal to be displayed at the rear end of a car or train at each stop so that it may be readily seen by the motorman of an approaching car or train, and thereby reduce the number of rear end collisions. The cars or trains on which these signals are used are generally equipped with air brakes and my object is to utilize the same power which operates the brakes to actuate the signal so that the act of stopping the car causes a danger signal to be simultaneously and automatically displayed at the rear of the car or train. In the present showing this is done by compressed air, but in some instances where the brakes are operated electrically or mechanically it may be necessary to provide corresponding electrical or mechanical connections between the brake and signal whereby both may be operated simultaneously and which is contemplated in this invention.

Other objects will be brought out in the following description.

In the drawings—Figure 1 is a diagrammatic view of a portion of a car showing an air brake and my improved signal as mounted upon the car. Fig. 2 is a perspective view of the detached signaling apparatus. Figs. 3 and 4 are sectional views taken respectively on lines 3—3, Fig. 1 and 4—4, Fig. 2. Figs. 5 and 6 are perspective views of the movable and fixed sections respectively of the signal device seen in Fig. 2. Fig. 7 is a sectional view taken on line 7—7, Fig. 1. Figs. 8 and 9 are sectional views of the valve in different positions for controlling the flow of compressed air to the brake and signal cylinders.

Similar reference characters indicate corresponding parts in all the views.

This signaling device is particularly useful on street cars in large cities where it is necessary to run the cars at high speed and close together, and owing to the fact that it is frequently necessary to stop these cars on short notice and at short irregular intervals it becomes imperative that some provision be made whereby the motorman of a following car is warned of such "stop" or "slow down" so that he may check or stop his own car in time to prevent a collision. The signal is, therefore, mounted in plain view upon the extreme rear end of the car, as for instance on a dash-board —*a*— and is here shown as comprising a fixed section or bracket —1— and a rotary or rocking section —2—. The fixed section —1— is secured by suitable rivets or bolts to the "dash" —*a*— and is formed with a flat upper horizontal face —3— and a vertical opening or bearing —4— to receive and support the rotary section —2—, and is also formed with a horizontal guide opening —5— and a laterally projecting cylinder —6— which receives a toothed rack —7— and piston —8— for operating the movable section —2—. This movable section —2— preferably consists of substantially a flat horizontal head —9— having a cylindrical depending spindle —10— and an upwardly projecting central stud —11— of angular cross section for receiving a removable bull's-eye lamp —12— when desired, said head being also provided with a depending circular toothed segment —13— which meshes with the rack —7— and whereby rotary motion is imparted from the reciprocatory rack —7— to the section —2—.

The spindle —10— is journaled in and projects through the opening —4— and the upper face of the fixed section —1— is formed with an annular groove or ball race 14— which is concentric with the spindle —10— and receives suitable antifriction balls 15— upon which the lower face of the movable section —2— rests. The lower end of the spindle is provided with a removable cotter key 10′ for holding the removable section from upward displacement. The head —9— is provided with vertical walls —16— and —17— which are disposed at substantially right angles to each other and their outer faces are colored in different colors, such as green and red, the green side being normally exposed to the rear to indicate that the car is moving while the red signal is normally at one side out of sight of the following car and is only brought into position facing the following car when the brake is applied in a manner hereinafter described. Inasmuch as these colored walls are only visible in daylight a bull's-eye lamp 12— is employed at night and is removably supported upon the angular stud —11— to rotate with the section —2— and is provided with red and green lights facing respectively the red and green sides of the head —9—.

The piston —8— and its toothed rack —7— are secured to each other and are held in their normal positions by a spring —18— which is located in the cylinder —6— with one end bearing against the piston head and its other end against an annular shoulder —19— at the inner end of the cylinder.

The outer end of the cylinder is formed with an air inlet opening —20— which is connected by a conduit —21— to a compressed air reservoir —22— so that when the compressed air is admitted to the cylinder it actuates the piston inwardly against the action of the spring —18— to rock the section —2 a quarter turn to display the red or danger signal at the rear and as soon as the air pressure is released the spring —18— returns the piston —8— and section —2— to their normal positions.

In order that the simultaneous action of the signal and brake may be clearly understood I have shown an ordinary air brake mechanism comprising a cylinder —23— in which is movable a suitable piston, the latter being connected in the usual manner to operate suitable brake shoes —24—. This cylinder —23— is also connected by a conduit —25— to the reservoir —22— and also to the conduit —21— and at the junction of these conduits is provided a three-way valve of such construction that when turned in one direction the compressed air will flow simultaneously from the reservoir —22— to both cylinders —6— and —23— to actuate the air brake and signal and when returned to its normal position the air will be cut off from the reservoir and the compressed air in the cylinders will be released. This form of valve is shown in Figs. 1, 8 and 9, in which the valve case is provided with passages 26, 27 and 28 leading respectively to the reservoir and to the conduits —25— and 21, and with a vent —29— opening to atmosphere while the valve is formed with a straight way 30— and a right angle branch 31— so that when the valve is in the normal position seen in Fig. 9, the conduits —21— and —25— open to atmosphere, and the reservoir is cut-out, and in the operative position seen in Fig. 8 the vent is closed and the conduits communicate with the reservoir. It is now seen that by operating a lever —32— to turn the valve from its normal position the air flows from the reservoir through both conduits —21— and —25— and into the cylinders —6— and —23— and that, therefore, the danger signal is displayed simultaneously with the operation of the brake and that as soon as the valve is returned the reservoir is cut out and the vent is opened to relieve the air pressure from the cylinders and permit their respective pistons to return to their normal positions.

Having thus described my invention what I claim and desire to secure by Letters Patent is—

1. A rear end car signal comprising a bracket secured to the car and provided with a vertical bearing and a horizontal guide opening, a cylinder secured to the bracket at one side of said bearing and opening into the guide opening, a signal head journaled on the bearing, a piston movable in the cylinder and operatively connected to rock the signal head, and means for introducing compressed air into the cylinder to operate the piston.

2. A signal for the purpose described comprising a fixed bracket having a horizontal guide opening and a horizontal cylinder secured to the bracket and opening into said guide-opening, a toothed rack movable endwise in the cylinder and guide-opening and provided with a piston, a rocking signal head mounted directly on the bracket and provided with a toothed segment meshing with the rack, and means for introducing air under pressure to the cylinder to actuate the piston and rack.

3. A rear end signal for cars, comprising a bracket secured to the car and provided with a vertical bearing and a horizontal guide opening at one side of the bearing, a toothed rack sliding endwise in the guide opening, a signal head journaled directly upon the bracket and provided with a toothed segment projecting into said guide-opening and meshing with the rack, a cylinder, a piston on one end of the rack operated by compressed air and means to supply compressed air to the cylinder.

4. The combination with an air brake cylinder for railway cars, of a bracket fixed to the car and provided with a vertical bearing and a horizontal guide opening, a cylinder having one end secured directly to the bracket in line with the guide opening and its other end provided with an air inlet, a compressed air reservoir connected to the air brake cylinder and to said inlet, means in the connection between the reservoir and cylinders to admit air to both cylinders simultaneously, a piston movable in the cylinder on the bracket and actuated by the inflowing air, a rod projecting from the piston into the guide opening and a signal head journaled directly on the bearing and operatively connected to and rocked by the piston rod.

5. The combination with an air-brake cylinder of a railway car, of an automatic signal comprising a bracket secured to the car and provided with a vertical bearing and with a horizontal guide opening at one side of the bearing, a cylinder secured directly to the bracket in alinement with the guide opening, a reservoir containing compressed air connected to said cylinders, a signal head journaled in the vertical bearing and overlying the guide opening, said head being provided with a toothed segment projecting into said guide-opening, a toothed rack guided in said guide-opening and a piston movable in the cylinder and actuated by the inflowing compressed air, said rack being attached to the piston and meshing with the toothed segment.

6. A car signal for the purpose described, comprising a fixed bracket having a guide-opening and a rotary signal head mounted directly upon the upper end of the bracket, the signal head being provided with a toothed segment projecting into said opening at one side of and concentric with its axis of rotation, a cylinder secured directly to the bracket, a piston movable in the cylinder, a rack in said opening connected to the piston and meshing with the segment and means for introducing compressed air into the cylinder to actuate the piston.

In witness whereof I have hereunto set my hand this 1st day of Nov., 1903.

PETER D. MILLOY.

Witnesses:
ANNA G. DRURY,
WASHINGTON L. ALBEE.